(12) United States Patent
Bansal et al.

(10) Patent No.: US 8,504,373 B2
(45) Date of Patent: Aug. 6, 2013

(54) PROCESSING VERBAL FEEDBACK AND UPDATING DIGITAL VIDEO RECORDER (DVR) RECORDING PATTERNS

(75) Inventors: Ravi P. Bansal, Tampa, FL (US); Mike V. Macias, Austin, TX (US); Saidas T. Kottawar, Pune (IN); Salil P. Gandhi, Yerwada (IN); Sandip D. Mahajan, Yerwada (IN)

(73) Assignee: Nuance Communications, Inc., Burlington, MA (US)

( * ) Notice: Subject to any disclaimer, the term of this patent is extended or adjusted under 35 U.S.C. 154(b) by 318 days.

(21) Appl. No.: 12/496,873

(22) Filed: Jul. 2, 2009

(65) Prior Publication Data

US 2011/0004477 A1    Jan. 6, 2011

(51) Int. Cl.
*G10L 21/00*    (2006.01)
*G10L 15/26*    (2006.01)

(52) U.S. Cl.
USPC .......................................... 704/275; 704/235

(58) Field of Classification Search
USPC ............................. 704/270, 270.1, 275, 235
See application file for complete search history.

(56) References Cited

U.S. PATENT DOCUMENTS 6,456,978 B1    9/2002    Wymore et al.
8,032,383 B1 *  10/2011   Bhardwaj et al. ............. 704/275
2003/0005431 A1 * 1/2003  Shinohara ...................... 725/12
2005/0132420 A1   6/2005  Howard et al.
2006/0075429 A1   4/2006  Istvan et al.
2007/0150916 A1 * 6/2007  Begole et al. .................. 725/10
2007/0174057 A1   7/2007  Genly

FOREIGN PATENT DOCUMENTS

JP    2000260170 A     9/2000
KR    10-0785988 B1    12/2007
KR    20070121104 A    12/2007

* cited by examiner

*Primary Examiner* — Angela A Armstrong
(74) *Attorney, Agent, or Firm* — Holland & Knight LLP; Mark H. Whittenberger, Esq.

(57) ABSTRACT

A method, a system and a computer program product for using speech/voice recognition technology to update digital video recorder (DVR) program recording patterns, based on program viewer/listener feedback. A speech controlled pattern modification (SCPM) utility utilizes a DVR recording sub-system integrated with speech processing functionality to compare control phrases with phrases uttered by a viewer. If a control phrase matches a phrase uttered by the viewer, the SCPM utility modifies the DVR recording patterns, according to a set of pre-programmed governing rules. For example, the SCPM utility may avoid modifying the recording patterns for programs within a list of "favorite" programs but may modify the recording patterns for programs excluded from the list. The SCPM utility determines priority of the uttered phrases by identifying users and retrieving a preset priority level of the identified users. The priority level is then used to control changes to the recording patterns.

19 Claims, 6 Drawing Sheets

PROCESSING VERBAL FEEDBACK AND UPDATING DIGITAL VIDEO RECORDER (DVR) RECORDING PATTERNS

BACKGROUND

1. Technical Field

The present invention generally relates to speech processing technology and in particular to controlling device functionality by using speech processing technology.

2. Description of the Related Art

Digital Video Recorders (such as those from Television Input Video Output ("TIVO") Inc.) are devices that typically record broadcasted television programs on a hard-disk based on a pre-configured schedule. This enables a television viewer to watch the recorded television programs at a later time or save them for repeated viewings. Typically, DVR devices provide a menu-driven graphical user interface (GUI) displayed on the television screen where the user can use a remote control device to select channels and television programs and set up the DVR to record the selected television programs when the programs are being broadcasted. Users can typically search for programs by genre, by name of the program, by days/times the program is broadcast, by keyword or by the names of the actors appearing in the program. Once the viewer has set up the channels and programs to record, the "recording pattern" is saved in the DVR hard-disk. The DVR automatically records the programs when these programs are broadcasted by the television stations.

Currently, there is no way to modify the currently stored DVR recording patterns based on user feedback. DVRs provide no efficient way/feature to modify an already stored recording pattern. The only way to change the previously stored recording pattern on the DVR is to navigate through the GUI and manually set up the programs to record or delete programs to record, which is a cumbersome process that is generally avoided by users. As a result the DVR hard drive may often get filled up with programs that the user has no desire to watch.

While watching a television program, a viewer may typically say phrases to fellow viewers such as "I love this program", "This is a bad TV show" or "This is a boring movie". Once the program ends, a viewer's level of appreciation for a program represented by words/phrases may typically be forgotten and lost, and the DVR recording patterns remains the same unless the user takes manual steps to modify the pattern.

Audience Measurement Systems provide a practical application of verbal feedback. Audience Measurement Systems measure how many people are in an audience, usually in relation to radio listeners and television viewers. Audience Measurement helps broadcasters determine how many people are watching or listening to a certain television or radio program. This allows broadcasters to gauge the "popularity" of particular television or radio programs (also known as the "rating"). This information is very useful for advertisers who wish to advertise products in a way that exposes the advertisements to the maximum number of viewers/listeners.

Conventional methods used for audience measurement only provide broadcasters with an indication of how many people were watching/listening to a particular program. These conventional methods do not reflect whether viewers actually liked or disliked a show/radio program. Many times when a multi-episodic program is in the beginning stages of the program's run, many viewers tune into the early episodes, leading to high ratings. However, if the viewers do not like the program, a relatively lower number of viewers will watch (or listen to) the program in the later weeks, which triggers a big drop in ratings. Knowing the "like" rating of a show/program may be useful for predicting the future ratings of these programs. Current systems are unable to provide useful feedback on the "like" rating of a program that may allow a broadcaster to predict a potential ratings drop and take action accordingly. Currently, there is no automatic way to modify the recording patterns based on verbal feedback.

SUMMARY OF ILLUSTRATIVE EMBODIMENTS

Disclosed are a method, a system and a computer program product for using speech/voice recognition technology to update digital video recorder (DVR) program recording patterns, based on program viewer/listener feedback. A speech controlled pattern modification (SCPM) utility utilizes a DVR recording sub-system integrated with speech processing functionality to compare control phrases with phrases uttered by a viewer. If a control phrase matches a phrase uttered by the viewer, the SCPM utility modifies the DVR recording patterns, according to a set of pre-programmed governing rules. For example, the SCPM utility may avoid modifying the recording patterns for programs within a list of "favorite" programs but may modify the recording patterns for programs excluded from the list. The SCPM utility determines priority of the uttered phrases by identifying users and retrieving a preset priority level of the identified users. The priority level is then used to control changes to the recording patterns.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for using speech/voice recognition technology to update digital video recorder (DVR)

program recording patterns, based on program viewer/listener feedback. A speech controlled pattern modification (SCPM) utility utilizes a DVR recording sub-system integrated with speech processing functionality to compare control phrases with phrases uttered by a viewer. If a control phrase matches a phrase uttered by the viewer, the SCPM utility modifies the DVR recording patterns, according to a set of pre-programmed governing rules. For example, the SCPM utility may avoid modifying the recording patterns for programs within a list of "favorite" programs but may modify the recording patterns for programs excluded from the list. The SCPM utility determines priority of the uttered phrases by identifying users and retrieving a preset priority level of the identified users. The priority level is then used to control changes to the recording patterns.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
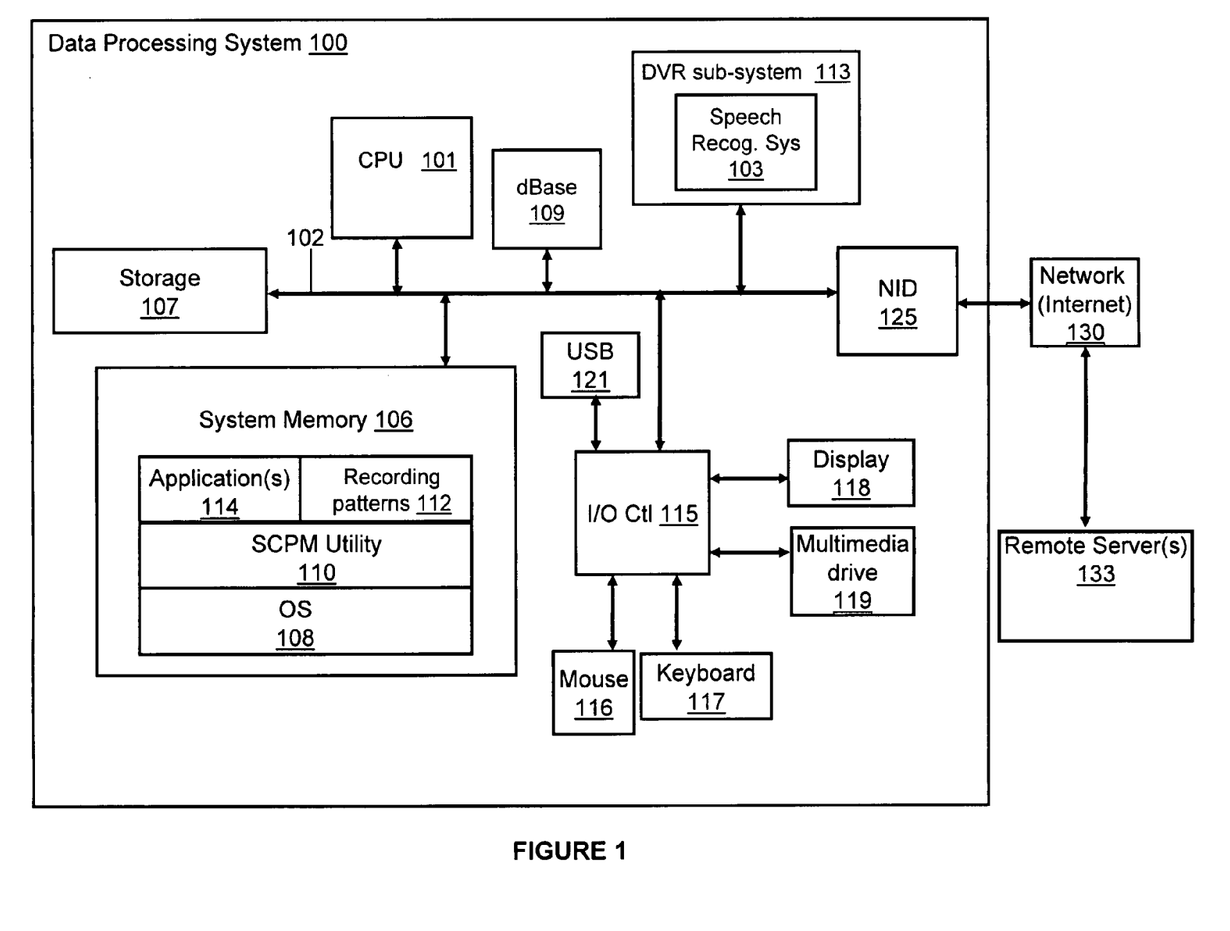
FIG. 1 provides a block diagram representation of a data processing system within which the invention may be practiced, according to one embodiment of the invention.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. DPS 100 also may represent a Digital Video Recorder (DVR) device. As illustrated, DPS/DVR 100 comprises at least one processor or central processing unit (CPU) 101 connected to system memory 106 via system interconnect/bus 102. Database 109 is also connected to system bus 102. DPS 100 also comprises storage 107, within/from which data/instructions/code may also be stored/retrieved. In addition, DVR recorder and controller sub-system 113 which comprises Speech Recognition System 103 is connected to system bus 102. Also connected to system bus 102 is input/output (I/O) controller 115, which provides connectivity and control for input devices, of which remote control transceiver/pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved.

DPS 100 is also illustrated with a network interface device (NID) 125, by which DPS 100 may connect to one or more access/external networks 130, of which the Internet is provided as one example. NID 125 may be configured to operate via wired or wireless connection to an access point of the network. Connection to the external network 130 may be established with one or more servers 133, which may also provide data/instructions/code for execution on DPS 100, in one embodiment.

In addition to the above described hardware components of DPS 100, various features of the invention are completed/supported via software (or firmware) code or logic stored within memory 106 or other storage (e.g., storage 107) and executed by CPU 101. Thus, for example, illustrated within memory 106 are a number of software/firmware/logic components, including operating system (OS) 108 (e.g., Microsoft Windows®, a trademark of Microsoft Corp, or GNU®/Linux®, registered trademarks of the Free Software Foundation and The Linux Mark Institute), DVR applications 114, Recording Patterns 112 and speech controlled pattern modification (SCPM) utility 110 (which executes on CPU 101 to provide SCPM logic).

During implementation of one or more embodiments of the invention, speech recognition functionality may be provided by a voice recognition application (e.g. IBM (International Business Machines) ViaVoice®, Dragon Naturally Speaking®, a product of Nuance Communications, Inc., Microsoft Windows® Speech Recognition, a product of Microsoft Corp), which may be separate from or associated with SCPM utility 110. In actual implementation, SCPM utility 110 may be combined with DVR applications 114 and Recording Patterns 112 to provide a single executable component, collectively providing the various functions of each individual software component when the corresponding portion of the combined code is executed by the CPU 101. For simplicity, SCPM utility 110 is illustrated and described as a stand alone or separate software/firmware component, which provides specific functions, as described below.

CPU 101 executes SCPM utility 110 as well as OS 108, which supports the user interface features of SCPM utility 110. In the described embodiment, SCPM utility 110 generates/provides several graphical user interfaces (GUI) to enable user interaction with, or manipulation of, the functional features of SCPM utility 110. Certain functions are supported and/or implemented by processing logic when SCPM utility is executed by processor 101. These functions may further utilize device hardware to complete the implementation of the functions. For simplicity of the description, the collective body of code that enables these various functions is referred to herein as SCPM utility 110. Among the software code/instructions/logic provided by SCPM utility 110, and which are specific to the invention, are: (a) code/logic for capturing and processing spoken/audio phrases/words to provide feedback to a content broadcaster; (b) code/logic for comparing pre-recorded (feedback) control phrases with spoken words/phrases uttered by a viewer while the viewer is watching/monitoring a television/radio program; and (c) code/logic for dynamically modifying DVR program recording patterns, according to a set of governing rules and filters. According to the illustrative embodiment, when CPU 101 executes SCPM utility 110, DPS 100 initiates a series of functional processes that enable the above functional features as well as additional features/functionality. These features/functionalities are described in greater detail below within the description of FIGS. 2-6.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

In one embodiment, the speech monitoring and other functionality described herein are provided/supported within a digital video recorder (DVR) device. The DVR would then include a user-setup guide to enable the monitoring and other functionality provided by the invention to be selectively turned on or off. A prompt to turn off monitoring may be provided at each start up of the DVR or during initial set-up and subsequent global set-up of the device. Alternatively, the option to turn the monitoring on or off may be provided as a menu item in the global menu of the DVR. In one implementation, a microphone symbol is provided on-screen (with television or computer viewing) whenever the monitoring functionality is "on" so that persons within the environment are aware that monitoring is ongoing. Additionally, in one implementation, a positive reward feature may be associated with the functionality being turned on, such that the device user or device owner is encouraged to turn the monitoring feature on. For example, when the functionality is turned on a DVR device that doubles as a cable/satellite receiver, marketing research may be conducted utilizing the device. A network-connected server then detects the receipt of data from the specific DVR device and responds by forwarding an electronic coupon/credit (generated on behalf of the market research facility/entity) to the DVR device to enable purchasing of a pay per view program from the cable or satellite provider.

Figure 2:
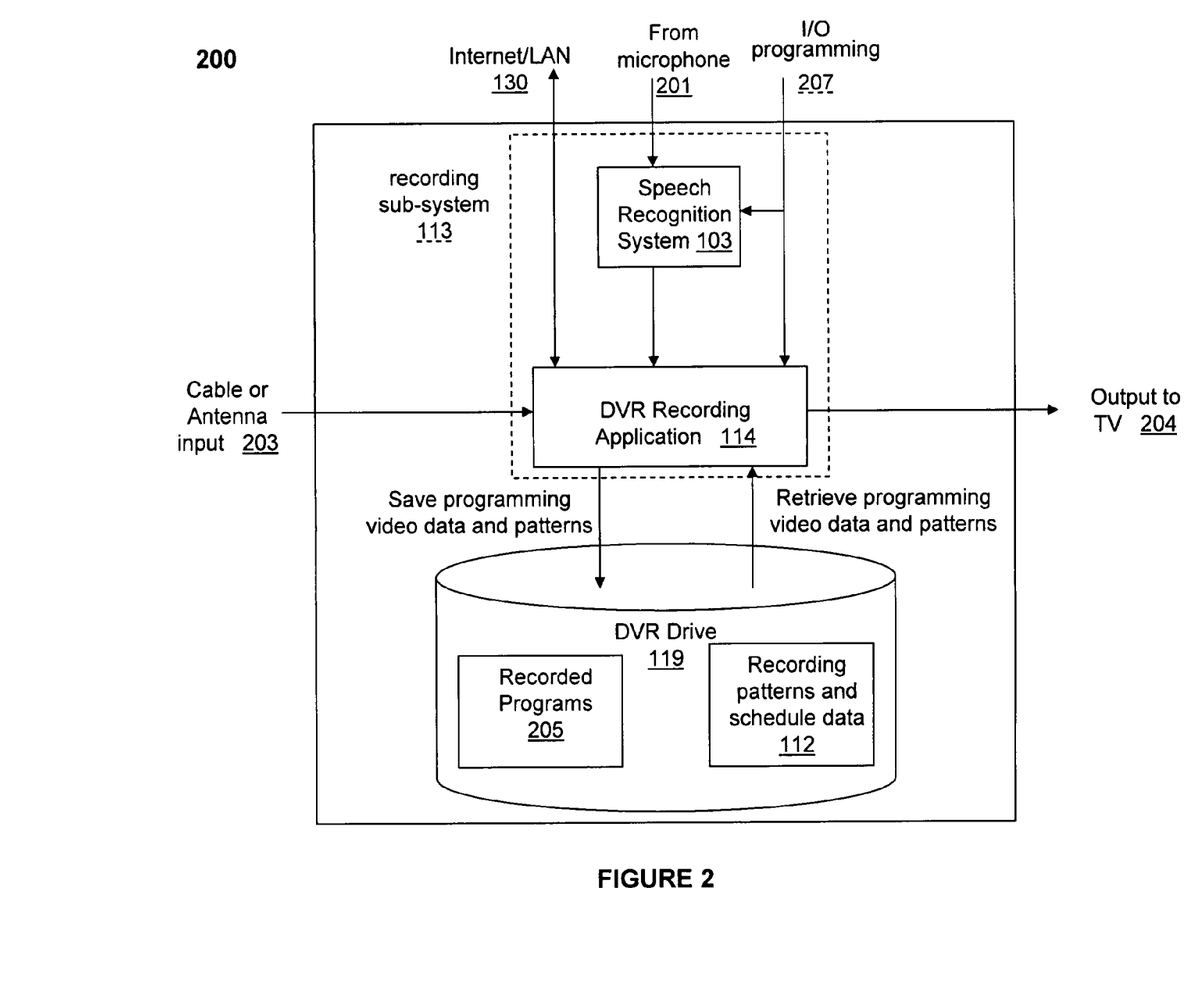
FIG. 2 illustrates a block diagram of a digital video recorder (DVR) system with a recording sub-system and a DVR recording application, according to one embodiment.

With reference now to FIG. 2, a DVR system with a recording sub-system is illustrated, according to one embodiment. DVR system 200 comprises DVR recording sub-system 113. DVR recording sub-system 113 further comprises Speech Recognition System (SRS) 103, which receives speech input 201 from an audio sensor/receiver device such as a microphone. DVR recording sub-system 113 also comprises DVR recording application 114 which communicates with SRS 103. DVR recording application 114 receives input video signals/programs via cable or antenna input 203. DVR recording application 114 transfers output video signals/programs 204 to a video display device/system, for example, a television. DVR system 200 includes DVR drive 119. DVR drive 119 comprises recorded programs 205 and recording patterns and schedule data 112. DVR system 200 is connected to a data network, for example, the Internet or Local Area Network (LAN) 130.

SCPM utility 110 utilizes Speech/Voice recognition technology within the DVR recording system, to capture and process words and phrases that may trigger updates of DVR program recording patterns. SCPM utility 110 may access a network or the Internet via the network interface capabilities of DVR System 200. SCPM utility 110, thus, enables a viewer to access the DVR recording functionality on a local DVR device or a remote device via a web-based interface. In one embodiment, SCPM utility 110 utilizes a local DVR recording program to update program recording patterns. In another embodiment, SCPM utility 110 uses an external device/program that uses the internet-based Application Programming Interface (API) provided by the DVR System 200 to modify the recording pattern stored in DVR System 200. The way in which SCPM utility 110 automatically modifies a recording pattern is described below.

In order to respect the privacy rights of the audience within the sensory receiving environment 203, during implementation of one or more of the various embodiments described herein, when voice recognition 249 is engaged, one or more privacy statements are displayed (and/or otherwise outputted within/at the environment) within and/or near the sensory receiving environment 203. The privacy statement informs each individual that one or more statements output (i.e. spoken, expressed via song, laughter, etc) within sensory receiving environment 203 are being monitored. The privacy statement further notifies an individual entering sensory receiving environment 203 that although the statements are monitored, the statements are not recorded. The monitored statements are analyzed by a computer system which outputs information associated with sensory receiving environment 203. The information obtained within sensory receiving environment 203 is unassociated with the individual(s) providing the output.

SCPM utility 110 activates features of the embodiment when a user/viewer begins viewing television. SCPM utility 110 uses SRS 103 to detect (key) phrases spoken by the viewer. SCPM utility 110 compares these key phrases with a set of pre-recorded control phrases. The pre-recording of control phrases may be performed as a one-time/occasional activity, i.e., a configuration/setup step that may be initiated anytime the user wishes to add and/or modify any control word/phrase. With each recorded control phrase, SCPM utility 110 enables the user to potentially have the option to set other parameters including a level of priority/weight of the feedback if the phrase is uttered by a particular person. SCPM utility 110 may enable the configuration/setup via a web based interface to the recording and voice capturing system. The control phrases are stored in the database.

If SCPM utility 110 finds a control phrase that matches an uttered phrase, SCPM utility 110 activates the recording pattern modification functionality of DVR sub-system 113 to automatically modify the recording pattern, according to a set of governing rules. In one embodiment, the DVR recording pattern modification functionality may be invoked directly via a voice/speech command (e.g., "delete future recordings"). Again, SCPM utility 110 uses a set of governing rules to dictate how the recording pattern is dynamically modified.

SCPM utility 110 utilizes a set of filtering rules to control changes to the recording patterns. The filtering rules may allow a recording pattern to be modified automatically, or avoid modifying the recording pattern. SCPM utility 110 may use a particular filter to search through a set of stored "favorite programs" to determine whether a program being viewed is exempt from specific changes to the recording pattern based on the program's inclusion in the list of "favorite programs". If the television program being watched matches a program in the set, then the system could potentially modify only those programs that are not in the set of favorite programs and avoid modifying programs that are in the set.

SCPM utility 110 may use another filter to detect key phrases spoken by the viewer, using SRS 103. For example, if the viewer says the phrase/sentence, "This is a boring program", or the keyword(s) "(is) boring" then SRS 103 may compare this phrase/keyword against pre-recorded phrases/ keywords. If a match is found, SCPM utility 110 may initiate automatic modification of recorded patterns.

SCPM utility 110 may utilize another filter to establish a priority level criterion based on the identity of the viewer. For example, if SCPM utility 110 (uses SRS 103 and) identifies the viewer as the owner of DVR System 200, SCPM utility 110 may initiate/perform actions based on a (high) preference/priority associated with phrases spoken by the owner. For example, only the owner's views may be considered in order to make recording changes. Conversely, SCPM utility 110 may assign a lower preference/priority to a guest or "unrecognized" speaker (whose words are captured by DVR sub-system 113) who may be watching the same program in the owner's home. While watching one television program, the viewer in a conversation with a fellow viewer, may say phrases like "I like XYZ movie". SCPM utility 110 may capture this type of remark to be used "real-time" for feedback recording purposes when that particular movie is running.

SCPM utility 110 may activate a delayed feedback feature that uses a historical count of "matches" of viewer phrases with control phrases before actually changing the recording pattern. SCPM utility 110 is able to track positive feedback phrases and negative feedback phrases over a period of time before actually making the decision to modify the recording pattern. For example, SCPM utility 110 may be prompted by a threshold negative count to change the recording patterns to avoid future recordings of a particular program. The recording pattern may not be updated directly by the system based on a viewer's choice or device configuration. Instead, SCPM utility 110 may trigger alerts and guide the viewer to actions pertaining to the recording pattern modifications. SCPM utility 110 may provide the viewer with a configurable option to select auto modifications by DVR System 200, or to provide system alerts to give the viewer decision making support.

SCPM utility 110 may utilize the enhanced capabilities of DVR sub-system 113 integrated with SRS 103 to automatically interface with other systems (e.g., Movie review sites), that may allow a viewer to share his (i.e., the viewer's) feedback and reviews with other persons. Further, SCPM utility 110 may utilize a reminder system that maintains/provides recognition of remote control keypad interactions during conversations. For instance, if the user/viewer presses a recognized code, for example, "1111", SCPM utility 110 may allow DVR system 200 to automatically delete or record the program in the future.

SCPM utility 110 uses speech recognition technology to initiate the capture of speech and utterances by a viewer/user that is watching a television/video program connected to a display device that is either (a) connected to DVR device 200 or (b) integrated with DVR device 200. SCPM utility 110 provides a configuration/setup facility within DVR recording sub-system 113 to enable a user to pre-record control words and phrases that SCPM utility 110 uses to create a set of governing rules and/or a set of filters. SCPM utility 110 uses speech recognition technology to capture real-time user feedback during the show/radio program and provide that feedback to a broadcaster. The useful features and functions of SCPM utility 110 are demonstrated in the examples described below.

Figure 3:
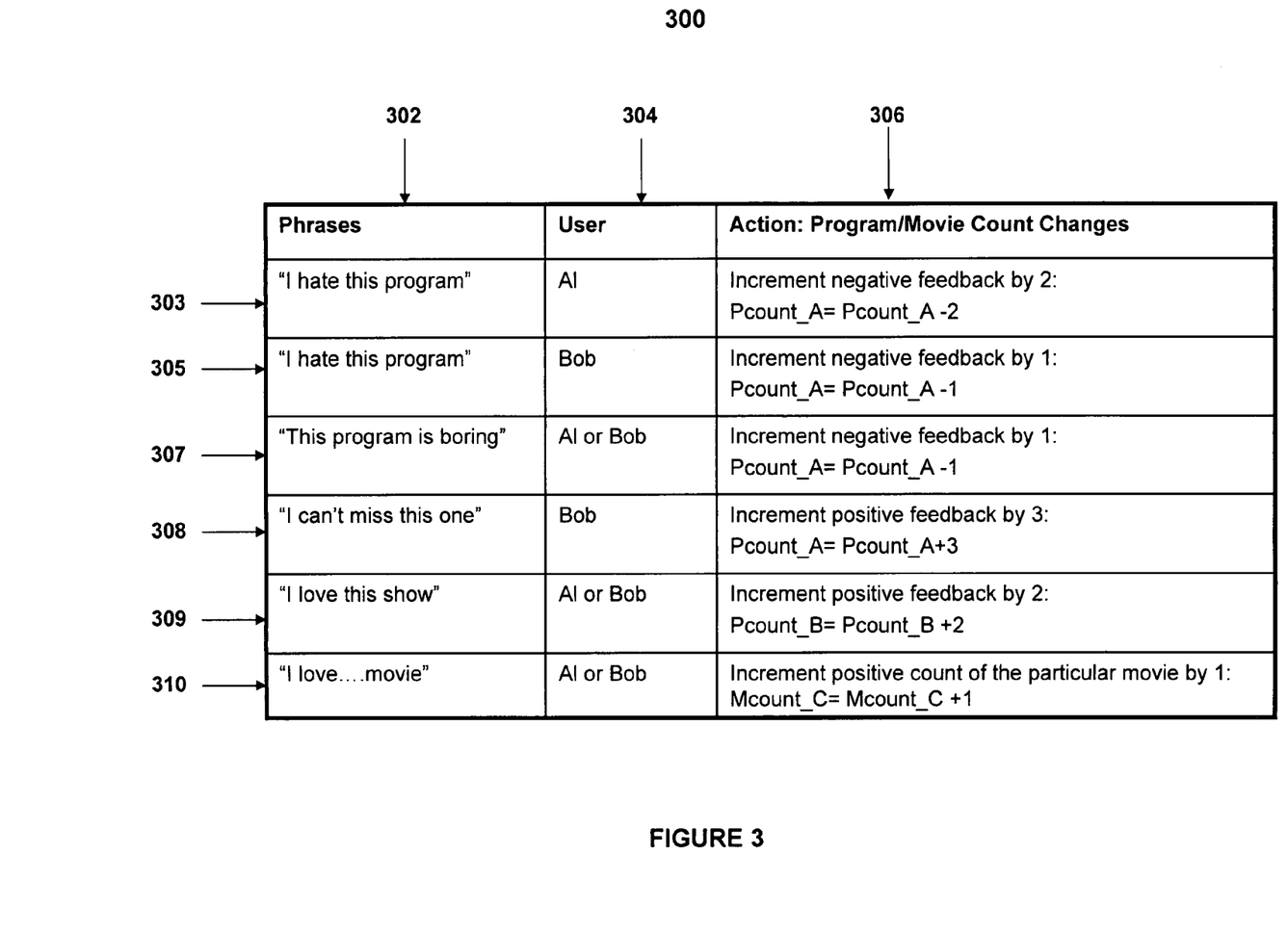
FIG. 3 illustrates an example table of control words and phrases used in the recording sub-system, according to one embodiment.

FIG. 3 illustrates an example table of control words and phrases obtained via the recording and voice capturing system, according to one embodiment. Control Table 300 comprises "Phrases" column 302, speaker/"User" column 304 and "Action: Program/Movie Count Changes" column 306. Control Table 300 contains multiple complete row entries including first row entry 303, second row entry 305, third row entry 307, fourth row entry 308, fifth row entry 309 and sixth row entry 310.

Figure 4:
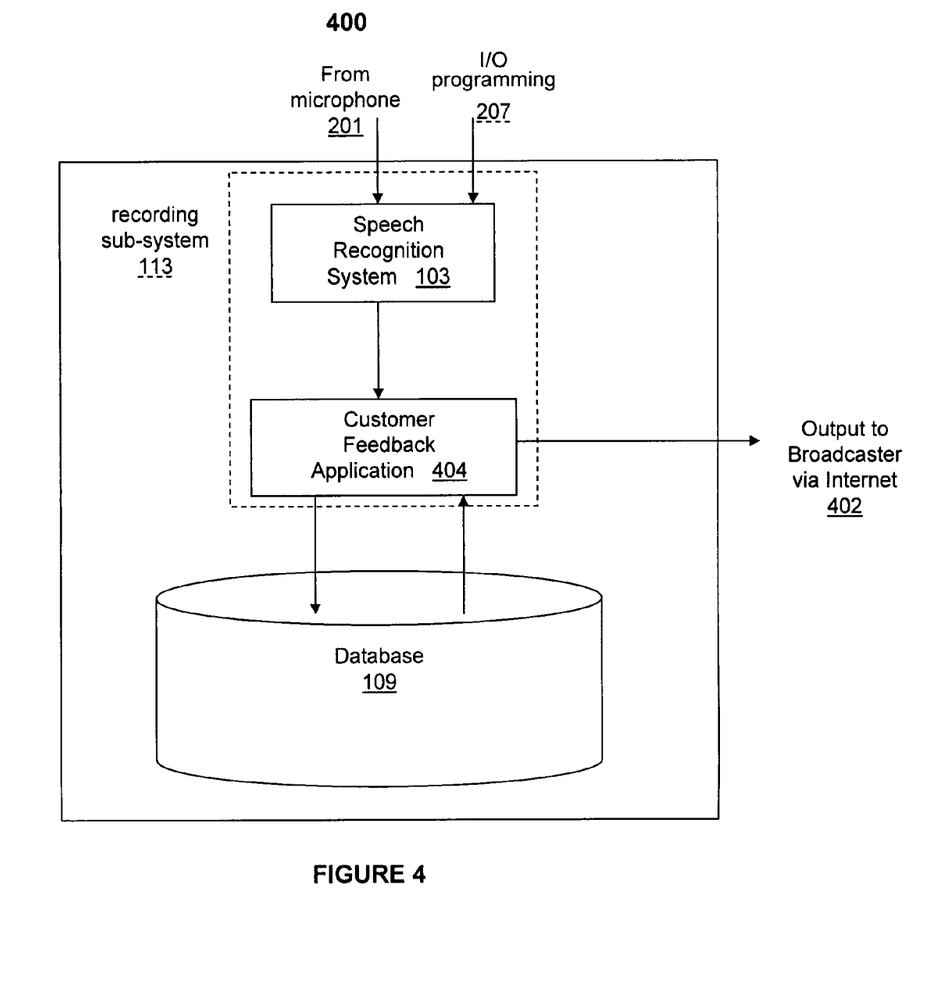
FIG. 4 illustrates a block diagram of a digital video recorder (DVR) system with the recording sub-system and a customer feedback application, according to one embodiment.

In the example of FIG. 4, a program named "A" is broadcasted on a TV channel. Initially, the program has a good rating, based on the number of viewers watching the show. As time passes, the popularity of program "A" decreases since the number of viewers watching the show decreases. On the other hand, a program named "B" is broadcasted on a TV channel and initially has a moderate rating based on the number of viewers watching the show. As time passes, the popularity of program "B" increases since the number of viewers watching the show increases.

SCPM utility 110 has the ability to collect user/audience feedback during the runtime of program "A" or "B", by using Speech recognition technology. A broadcaster may use the feedback to help adjust (i.e., increase or maintain) the rating for a particular program. The feedback recording functionality is able to detect frequently used key phrases like "This is boring", "I hate this show", "I love this program", "Great show", etc., together with the program which is currently running on TV or radio.

Referring again to Table 300, a further example illustrating the process of obtaining dynamic user feedback for a program in real-time is described. In the example, two (2) persons, "Al" and "Bob", are watching a particular TV program. SCPM utility 110 uses DVR sub-system 113 to capture phrases spoken in the room. During the show, Al utters a number of feedback phrases/keywords including "I hate this program"/"hate", as indicated within first row entry 303. Bob says "I can't miss this one"/"can't miss", as indicated within fourth row entry 308. SCPM utility 110 may check the device configurations for control phrases/keywords via an interface with the web database. SCPM utility 110 saves the captured phrases as feedback since SCPM utility 110 identifies matching control feedback phrases/keywords in database 109.

In this instance, the positive feedback from Bob is higher then the negative feedback from Al and the program recording continues. In particular, First row entry 303 indicates that Al's negative feedback has a (negative) weight of two (2) points. The corresponding program counter value "Pcount_A" for program "A" is adjusted to Pcount_A−2, as illustrated in first row entry 303 of "Action: Program/Movie Count Changes" column 306. Fourth row entry 308 indicates that Bob's positive feedback has a (positive) weight of three (3) points. The corresponding program counter value "Pcount_A" for program "A" is adjusted to Pcount_A+3, as illustrated in fourth row entry 308 of "Action: Program/Movie Count Changes" column 306. However, if both users say they hate the program, while watching the program, SCPM utility 110 may allow DVR system 200 to remove the recording of the program. The update to the recording pattern may again happen through the web interface to enable access to system features at various locations. SCMP utility 110 may provide the viewer with a configurable option to select auto modifications to the recording pattern by the system or to have system alerts to give him decision making support.

SCPM utility 110 saves the captured phrases as feedback since SCPM utility 110 identifies a matching control feedback phrase during a check of device/control phrase configurations in database 109. At the conclusion of the program, SCPM utility 110 may update both positive and negative feedback as one feedback (from Al) expresses "like" while the other (from Bob) expresses "dislike". SCPM utility 110 may forward the feedback to the broadcaster via the Internet. SCPM utility 110 may provide feedback in a format that indicates the count of positive and negative feedback received. The broadcaster obtains information about the program's like/dislike rating and may take action accordingly.

Table 300 further indicates that different weights/preferences/priorities are attached to identical phrases spoken by each viewer. For example, if Bob also says "I hate this program", as indicated within second row entry 305 of Table 300, SCPM utility 110 increments the negative feedback by one point. When Al utters "I hate this program", as indicated within first row entry 303 of Table 300, SCPM utility 110 increments the negative feedback by two points. In some cases, feedback for a particular movie may be desired and obtained using a particular feedback control phrase. This feedback may be desired/collected only for a particular period of time for a particular movie and may be repeatedly collected for an extended period of time for a TV show. The user may have different phrases to identify/distinguish feedback for movies and feedback for shows. In particular, sixth row entry 310 of Table 300 indicates that if either Al or Bob utters "I love . . . movie", while watching a particular movie, SCPM utility 110 matches this phrase and updates the feedback tally/count for the particular movie. In addition, SCPM utility 110 increments the positive count of the particular movie by one (1) point. The corresponding movie counter value "Mcount_C" for movie "C" is adjusted to Mcount_C+1, as illustrated in sixth row entry 310 of "Action: Program/Movie Count Changes" column 306.

FIG. 4 illustrates a block diagram of a digital video recorder (DVR) system with a recording sub-system utilized with a customer feedback application, according to one embodiment. DVR system 400 comprises DVR recording sub-system 113. DVR recording sub-system 113 further comprises Speech Recognition System (SRS) 103, which receives speech input 201 from an audio sensor device such as a microphone. DVR recording sub-system 113 also comprises Customer Feedback application 404 which utilizes the speech processing capabilities of SRS 103. Customer Feedback application 404 transfers output/feedback 402 to a broadcaster. DVR system 200 is connected to a data network, for example, Internet/Local Area Network (LAN) 130 (not explicitly shown) in order to transfer feedback to the broadcaster.

While a viewer watches a particular program on a television connected to DVR System 200, SCPM utility 110 initiates capture of the phrases spoken in the room. SCPM utility 110 utilizes DVR sub-system 113 (e.g., SRS 103 and Customer Feedback application 404) to capture the spoken phrases. SCPM utility 110 searches database 109 for a match for the captured phrase with a feedback control phrase. If a match is found, SCPM utility 110 saves the captured phrase, in database 109, as feedback for the program. After the current program ends, SCPM utility 110 updates the feedback and forwards feedback data 402 to the broadcaster via the Internet. SCPM utility 110 may provide feedback data 402 in a format that indicates the amount of positive and negative feedback received. Thus, SCPM utility 110 is capable of transferring the viewer feedback data to the broadcaster as an organized count of specific program feedback.

SCPM utility 110 provides an accurate measurement of live/instantaneous viewer/listener feedback for a program/show in progress to assist with program planning/scheduling. For example, if many viewers responds to the show with negative phrases like "This is boring", "I hate this show", SCPM utility 110 provides an indication that even though the program is being watched/listened to, the show most likely may not be as popular in upcoming weeks. On the other hand, if the viewer/listener is uttering positive phrases like "I love this program", "Great show", the show may most likely maintain high popularity in the future weeks. Perhaps, the broadcaster may quickly expand broadcast of the program into other markets.

Figure 5:
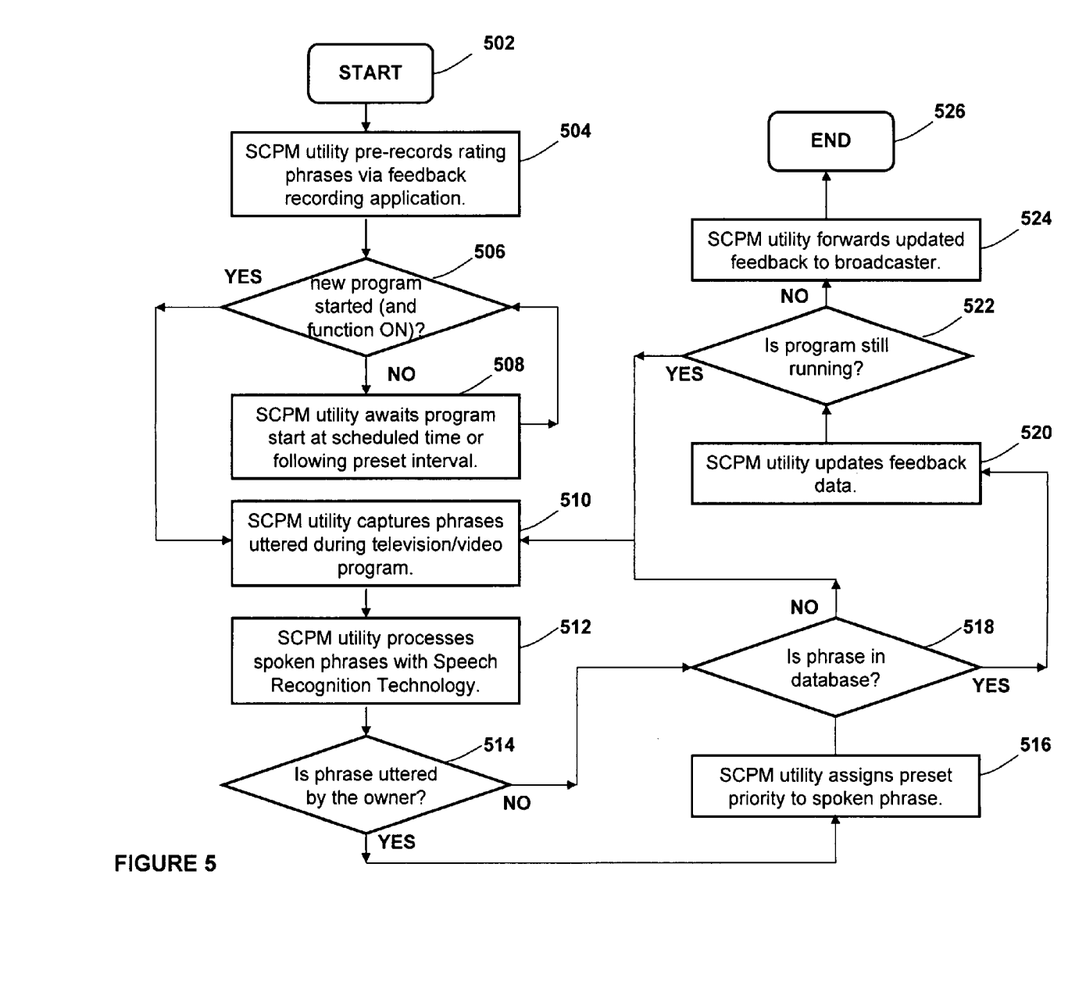
FIG. 5 is a flow chart illustrating the process of capturing and processing spoken words/phrases to provide feedback to a television broadcaster, according to one embodiment of the invention.
Figure 6:
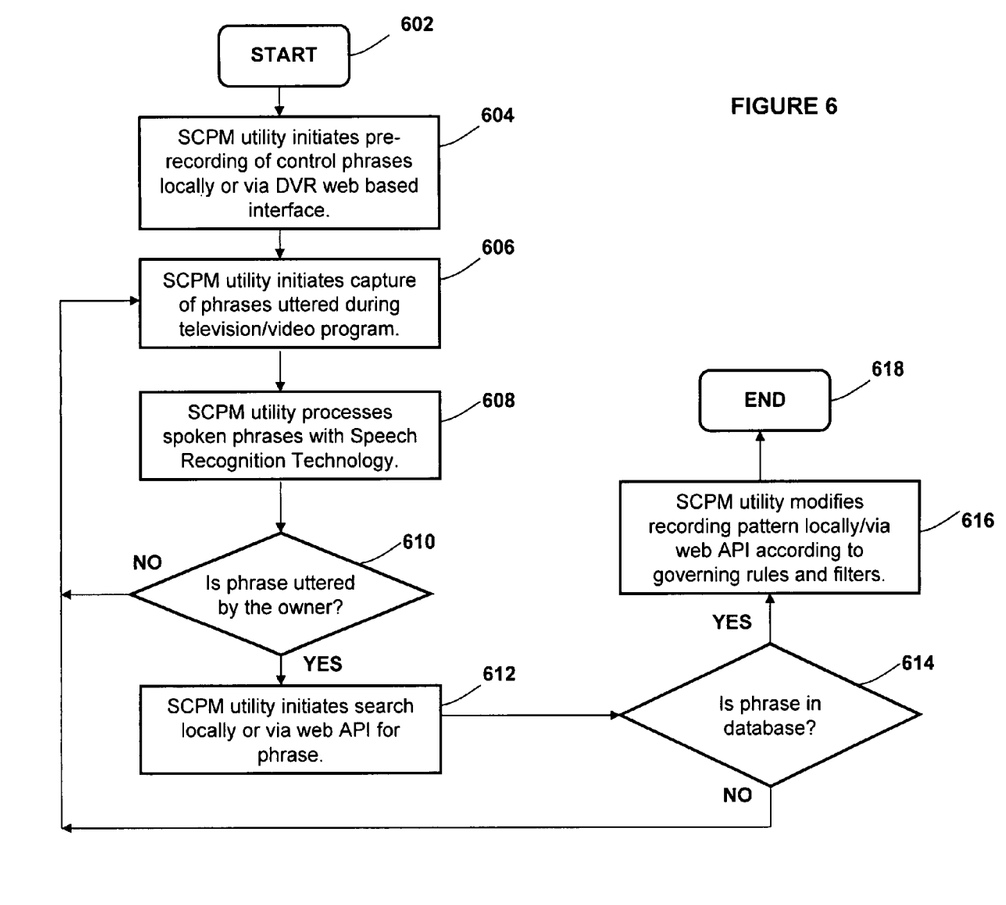
FIG. 6 is a flow chart illustrating the process of capturing and processing spoken words/phrases in order to modify program recording patterns, according to one embodiment of the invention.

FIGS. 5-6 are flow charts illustrating various methods by which the above processes of the illustrative embodiments are completed. In particular, FIG. 5 illustrates the method of capturing and processing spoken phrases to provide feedback to a television broadcaster. FIG. 6 specifically illustrates the method of capturing and processing spoken phrases in order to modify program recording patterns. Although the methods illustrated in FIGS. 5-6 may be described with reference to components shown in FIGS. 1-4, it should be understood that this is merely for convenience and alternative components and/or configurations thereof can be employed when implementing the various methods. Key portions of the methods may be completed by SCPM utility 110 executing on processor 101 within DPS/DVR 100 (FIG. 1) and controlling specific operations of/on DPS/DVR 100, and the methods are thus described from the perspective of either/both SCPM utility 110 and DPS/DVR 100.

The process of FIG. 5 begins at initiator block 502 and proceeds to block 504, at which SCPM utility 110 pre-records rating control phrases for a feedback recording application. At decision block 504, SCPM utility 110 determines whether a program for which feedback is to be monitored is in-progress. If at block 506, SCPM utility 110 determines that the program is in-progress, then SCPM utility 110 initiates capture of phrases uttered during the radio/television show/program, as shown at block 510. If, at block 506, SCPM utility 110 determines that the program is not in-progress, SCPM utility 110 awaits a program start at a scheduled time or re-checks whether the program is in-progress following a preset interval, as shown at block 508. At block 512, SCPM utility 110 processes spoken phrases, using Speech Recognition System (SRS) 103.

At decision block 514, SCPM utility 110 determines whether a spoken phrase is uttered by the owner of the associated recording device (e.g., device 140). If, at block 514, SCPM utility 110 determines that the spoken phrase is uttered by the owner, then SCPM utility 110 assigns a pre-selected priority to the spoken phrase uttered during the television show/program, as shown at block 516. If, at block 514, SCPM utility 110 determines that the spoken phrase is not uttered by the owner, the process proceeds to decision block 518. At decision block 518, SCPM utility 110 determines whether a spoken phrase matches a control feedback phrase located in the database. If, at block 518, SCPM utility 110 determines that the spoken phrase matches a feedback control phrase, then SCPM utility 110 updates feedback data corresponding to the spoken phrase/control phrase, as shown at block 520. If, at block 518, SCPM utility 110 determines that the spoken phrase has no match in the database, the process proceeds to decision block 522, at which SCPM utility 110 determines whether the television program is still running.

If, at block 522, SCPM utility 110 determines that the television program is still running the process returns to block 510. If, at block 522, SCPM utility 110 determines that the television program is no longer running, SCPM utility 110 tallys and forwards updated feedback information to the program broadcaster, as shown at block 524. The process ends at block 526.

The process of FIG. 6 begins at initiator block 602 and proceeds to block 604, at which SCPM utility 110 pre-records control phrases for a feedback recording application. SCPM utility 110 initiates capture of phrases uttered during a television/radio show/program, as shown at block 606. At block 608, SCPM utility 110 processes spoken phrases by translating these spoken phrases into text and extracting features of the speech, using Speech Recognition System (SRS) 103. At decision block 610, SCPM utility 110 determines whether a captured phrase is uttered by the owner of the associated recording device (e.g., device 140). If, at block 610, SCPM utility 110 determines that the captured phrase is uttered by the owner then SCPM utility 110 initiates a search via a local network or a web-based API, for a match of the captured phrase with a control phrase located in a local/remote database, as shown at block 612. If, at block 610, SCPM utility 110 determines that the captured phrase is not uttered by the owner/authorized user, the process returns to block 606.

At decision block 614, SCPM utility 110 determines whether a captured phrase matches a control phrase. If, at block 614, SCPM utility 110 determines that the captured phrase matches a control phrase, then SCPM utility 110 modifies a recording pattern on a local DVR system or stored on a remotely located DVR system which is accessible via web API. SCPM utility 110 modifies the recording pattern according to governing rules and filters, as shown at block 620. In one embodiment, the governing rules or filters determine whether the recording patterns are modified in real-time or based on delayed feedback via an aggregated count. In another embodiment, the governing rules and filters, conditions any changes to recording patterns upon the priority level assigned to the speaker of the feedback. If, at block 614, SCPM utility 110 determines that the captured phrase has no match in the database, the process returns to block 606. The process ends at block 618.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, or by copying the code from the storage device into another storage device such as a hard disk, RAM, etc. The medium may be electronic, magnetic, optical, or semiconductor system (or apparatus or device). Further, the medium may be any apparatus that may store, the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system, can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the recordable type (tangible) media used to actually carry out the distribution, such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a digital video recorder (DVR) system, a method comprising:
   a processor recording control phrases for subsequent comparison with phrases uttered by a viewer;
   the processor creating a set of governing rules;
   the processor comparing the phrases uttered by the viewer with the recorded control phrases;
   the processor identifying a match between the phrases uttered by the viewer and the recorded control phrases, wherein the match comprises a match phrase; and
   in response to identification of the match:
     (a) the processor designating said match phrase as user feedback;
     (b) the processor updating user feedback data; and
     (c) the processor automatically modifying program recording patterns based on user feedback;

wherein said governing rules include elimination of future recording only if further specific matches are identified or if particular results are obtained following an application of one or more filters; and wherein said governing rules further include initiation of a confirmation procedure at a pre-specified interval including an interval at a completion of a program that is viewed current to detection of recognized phrases.

2. The method of claim 1, wherein:

said comparing comprises:

the processor translating one or more phrases uttered by the viewer into text using speech and voice recognition technology to obtain one or more translated phrases; and the processor comparing the one or more translated phrases with the recorded control phrases; and said method further comprises:

the processor obtaining an identity of the viewer using speech and voice recognition technology.

3. The method of claim 1, wherein said modifying comprises:

the processor determining whether to trigger specific changes indicated by the set of governing rules by using a group of filters on the phrases uttered by the viewer; and in response to identifying the match, the processor initiating changes in the program recording patterns according to one or more of: (a) the set of governing rules; (b) a frequency of detection of the phrases uttered by the viewer; (c) a group of filtering rules; and (d) control keypad interactions;

wherein said match provides an indication of a level of appreciation or dislike for a particular program.

4. The method of claim 1, further comprising:

the processor implementing the set of governing rules via a configuration procedure.

5. The method of claim 3:

wherein said group of filtering rules provide one or more conditions from among: (a) elimination of a program unless the program is included in a list of favorite programs; and (b) triggering of an action provided by the set of governing rules based on a priority level of a detected speaker.

6. The method of claim 1, further comprising:

the processor initiating changes to recording patterns by one or more of: (a) directly via the DVR system; and (b) remotely, via an external device or external software that uses an internet-based Application Programming Interface (API) provided by the DVR system.

7. The method of claim 1, further comprising:

the processor generating modifiable program recording patterns; and the processor detecting verbal utterances via one or more audio sensor devices including a microphone.

8. A data processing system comprising:

one or more processors;

a computer readable tangible storage device;

computer code, stored on the storage device and executable by the one or more processors, to record control phrases for subsequent comparison with phrases uttered by a viewer;

computer code, stored on the storage device and executable by the one or more processors, to create a set of governing rules;

computer code, stored on the storage device and executable by the one or more processors, to compare the detected phrases uttered by the viewer with pre-recorded control phrases;

computer code, stored on the storage device and executable by the one or more processors, to identify a match between the detected phrases uttered by the viewer and the pre-recorded control phrases, wherein the match comprises a match phrase; and computer code, stored on the storage device and executable by the one or more processors, responsive to identification of the match, to:

(a) designate said match phrase as user feedback;

(b) update user feedback data; and (c) automatically modify program recording patterns based on user feedback;

wherein said governing rules include elimination of future recording only if further specific matches are identified or if particular results are obtained following an application of one or more filters; and wherein said governing rules further include initiation of a confirmation procedure at a pre-specified interval including an interval at a completion of a program that is viewed current to detection of recognized phrases.

9. The data processing system of claim 8, wherein:

the computer code to compare the detected phrases with the pre-recorded control phrases comprises:

computer code, stored on the storage device and executable by the one or more processors, to translate one or more phrases uttered by the viewer into text using speech and voice recognition technology to obtain one or more translated phrases; and computer code, stored on the storage device and executable by the one or more processors, to compare the one or more translated phrases with the pre-recorded control phrases; and the data processing system further comprises:

computer code, stored on the storage device and executable by the one or more processors, to obtain an identity of the viewer using speech and voice recognition technology.

10. The data processing system of claim 8, further comprising:

computer code, stored on the storage device and executable by the one or more processors, to determine whether to trigger specific changes indicated by the set of governing rules by using a group of filters on the phrases uttered by the viewer; and computer code, stored on the storage device and executable by the one or more processors, responsive to the identification of the match, to initiate changes in the program recording patterns according to one or more of: (a) the set of governing rules; (b) a frequency of detection of the phrases uttered by the viewer; (c) a group of filtering rules; and (d) control keypad interactions;

wherein said match provides an indication of a level of appreciation or dislike for a particular program.

11. The data processing system of claim 8, further comprising:

computer code, stored on the storage device and executable by the one or more processors, to implement the set of governing rules via a configuration procedure.

12. The data processing system of claim 10:

wherein said group of filtering rules provide one or more conditions from among: (a) elimination of a program unless the program is included in a list of favorite programs; and (b) triggering of an action provided by the set of governing rules based on a priority level of a detected speaker.

13. The data processing system of claim 8, further comprising:
computer code, stored on the storage device and executable by the one or more processors, to initiate changes to recording patterns by one or more of: (a) directly via a DVR; and (b) remotely, via an external device or external software that uses an internet-based API provided by the DVR.

14. A computer program product comprising:
a computer readable tangible storage device;
program code, stored on said computer readable tangible storage device, to record control phrases for subsequent comparison with phrases uttered by a viewer;
program code, stored on said computer readable tangible storage device, to create a set of governing rules;
program code, stored on said computer readable tangible storage device, to compare the phrases uttered by the viewer with pre-recorded control phrases;
program code, stored on said computer readable tangible storage device, to identify a match between the phrases uttered by the viewer and the pre-recorded control phrases, wherein the match comprises a match phrase; and
program code, stored on said computer readable tangible storage device, responsive to identification of the match, to:
(a) designate said match phrase as user feedback;
(b) update user feedback data; and
(c) automatically modify program recording patterns based on user feedback;
wherein said governing rules include elimination of future recording only if further specific matches are identified or if particular results are obtained following an application of one or more filters; and
wherein said governing rules further include initiation of a confirmation procedure at a pre-specified interval including an interval at a completion of a program that is viewed current to detection of recognized phrases.

15. The computer program product of claim 14, wherein:
the program code to compare the phrases with the pre-recorded control phrases comprises:
program code, stored on said computer readable tangible storage device, to translate one or more phrases uttered by the viewer into text using speech and voice recognition technology to obtain one or more translated phrases; and
program code, stored on said computer readable tangible storage device, to compare the one or more translated phrases with the pre-recorded control phrases; and
wherein the computer program product further comprises:
program code, stored on said computer readable tangible storage device, to obtain an identity of the viewer using speech and voice recognition technology.

16. The computer program product of claim 14, further comprising:
program code, stored on said computer readable tangible storage device, to determine whether to trigger specific changes indicated by the set of governing rules by using a group of filters on the phrases uttered by the viewer; and
program code, stored on said computer readable tangible storage device, responsive to identification of the match, to initiate changes in the program recording patterns according to one or more of: (a) the set of governing rules; (b) a frequency of detection of the detected phrases; (c) a group of filtering rules; and (d) control keypad interactions;
wherein said match provides an indication of a level of appreciation or dislike for a particular program.

17. The computer program product of claim 14, further comprising:
program code, stored on said computer readable tangible storage device, to implement the set of governing rules via a configuration procedure.

18. The computer program product of claim 16:
wherein said group of filtering rules provide one or more conditions from among: (a) elimination of a program unless the program is included in a list of favorite programs; and (b) triggering of an action provided by the set of governing rules based on a priority level of a detected speaker.

19. The computer program product of claim 14, further comprising:
program code, stored on said computer readable tangible storage device, to initiate changes to recording patterns by one or more of: (a) directly via a DVR; and (b) remotely, via an external device or external software that uses an internet-based API provided by the DVR.

* * * * *